United States Patent Office 2,795,579
Patented June 11, 1957

2,795,579

PROCESS FOR PURIFICATION OF CHITOSAN BY MEANS OF THE SALICYLIC ACID SALT THEREOF

John Doczi, Morristown, N. J., assignor to Warner-Lambert Pharmaceutical Company, Morris Plains, N. J., a corporation No Drawing. Application October 9, 1953,
Serial No. 385,285

10 Claims. (Cl. 260—211)

This invention relates to a process of purification and fractionation of certain aminopolysaccharide preparations.

The aminopolysaccharides which I use in the practice of my invention may be derived from the naturally occurring acetamidopolysaccharide, chitin, which is obtained from the shells of various Crustacea by an extraction procedure such, for example, as that described by H. Brach, Biochemische Zeitschrift, volume 38, page 475 (1912).

The aminopolysaccharides which I employ in the practice of my invention are derived from chitin by deacetylation. Such deacetylation is attended by a certain degree of depolymerization, and when drastic reaction conditions such as prolonged reaction time are employed partial deamination occurs. The material which is obtained by the deacetylation of chitin is termed "chitosan," a substantially acetyl-free partially depolymerized chitin which may be partially deaminated and which consists of a mixture of components which differ essentially from one another only in molecular weight. The term "chitosan," as used in this application includes both undeaminated chitosan, which has a nitrogen content of 8.7% and partially deaminated chitosan, whose nitrogen content is appreciably less than the value 8.7%, of undeaminated chitosan. The exact molecular structure of partially deaminated chitosan is not known at present.

Since chitosan has considerable usefulness, as for example, as an intermediate in the preparation of certain anticoagulants as described in my co-pending application, Serial No. 308,946, filed September 10, 1952, it has become desirable to find some means of effecting a purification of chitosan as well as a fractional separation thereof into a number of substantially homogeneous fractions covering a wide range in molecular weight. Although many attempts have previously been made to achieve this objective none has resulted in any appreciable measure of success.

I have now discovered a process whereby chitosan may be purified from extraneous material which includes inorganic salts, proteinaceous materials and gums. The purification procedure consists of adding an excess of a soluble salicylate, preferably an alkali metal salicylate such as sodium salicylate, to an aqueous solution of a chitosan salt followed by chilling the resulting mixture in an ice-water bath whereupon the chitosan precipitates as the salicylic acid salt thereof. By soluble salicylate, I mean salicylic acid and those salicylic salts which are more soluble in water than chitosan salicylate. The high solubility of the sodium salicylate makes it particularly useful in this invention. The precipitate is separated by centrifugation, redissolved in water and the resulting solution is filtered and adjusted to a pH of about 9, by the addition thereto of a water-soluble base such as sodium hydroxide, ammonium hydroxide or diethylamine, and the resulting precipitate is collected, washed with a water-miscible organic solvent and dried, yielding the desired chitosan in purified form. This method of chitosan purification is illustrated by Example I, described below, and the results obtained therein are summarized in Table I. It will be noted from Table I that the product of the process described in Example I was obtained in high yield and represents a substantial increase in nitrogen content corresponding to a substantial increase in purity.

TABLE I

*Purification of chitosan*

| | Weight (g.) | Percent Yield of original chitosan | Reduced viscosity | Percent N |
|---|---|---|---|---|
| Chitosan before purification | 16.1 | 100 | 6.746 | 7.65 |
| Chitosan after purification | 13.3 | 89.6 | 7.230 | 8.30 |

A more extensive purification process, and one which results in a high degree of resolution, providing a sharp fractionation of the chitosan, consists of adding an excess of an alkali metal salicylate such as sodium salicylate to an aqueous solution of a chitosan salt, gently warming to effect complete solution followed by gradual cooling in stages, in a thermostatically controlled cooling bath. In this manner fractions of chitosan salicylate separate at the various temperature levels in accordance with the solubility characteristics of the individual fractions. Each fraction is separately collected, redissolved in water, and treated with a base to liberate the corresponding chitosan base fraction in the manner indicated above. This method of chitosan fractionation is illustrated by Example II described below, and the results obtained are indicated in Table II. A further illustration of the procedure of fractionation of chitosan, performed in a manner similar to that described in Example II, is shown in Table III.

TABLE II

*Fractionation of chitosan having a reduced viscosity of 0.758*

| Fraction | Temperature of pptn. (° C.) | Reduced Viscosity | Weight (g.) | Percent of original quantity of chitosan |
|---|---|---|---|---|
| a | 35 | 1.368 | 1.92 | 32.00 |
| b | 27 | 0.601 | 0.65 | 10.80 |
| c | 24 | 0.470 | 0.13 | 2.17 |
| d | 14 | 0.398 | 0.15 | 2.50 |
| e | 9 | 0.326 | 0.09 | 1.50 |
| f | 8 | 0.305 | 0.10 | 1.67 |
| g | (a) | 0.192 | 0.67 | 11.16 | a This fraction was obtained by neutralization of mother liquor of fraction (f).

It will be noted that in accordance with the process of my invention the chitosan used as starting material was resolved into a succession of fractions whose reduced viscosities cover a wide range and follow an orderly decreasing sequence, reduced viscosity being a conventional parameter which is proportional to molecular weight.[1] It will therefore be appreciated that the process of my invention makes possible the resolution of a heterogeneous mixture of chitosans of different molecular weights into a number of fractions of increased homogeneity. Repeated experiments have shown that in the course of operation of the new process the treated chitosan undergoes no appreciable degradation.

[1] All reduced viscosity measurements were preformed on 1% solutions of chitosan in normal aqueous acetic acid at 30° C.

TABLE III

*Fractionation of chitosan having a reduced viscosity of 3.978*

| Fraction | Temperature of pptn. (° C.) | Reduced Viscosity | Weight (g.) | Percent of original quantity of chitosan |
|---|---|---|---|---|
| a | 20 | 8.146 | 100.92 | 11.69 |
| b | 13 | 6.374 | 3.27 | 0.38 |
| c | 8 | 4.490 | 8.70 | 1.00 |
| d | 5 | 3.744 | 137.39 | 15.82 |
| e | (1) | 2.531 | 367.92 | 42.40 |

[1] This fraction was obtained by neutralization of mother liquor of fraction (d).

In the two procedures discussed above and illustrated by Examples I and II respectively, the various experimental conditions employed may be varied over a reasonably wide range without detracting from the object of my invention, which is to provide chitosan of increased purity and/or increased homogeneity. Thus the acid used to form the salt of the starting chitosan may, for example, be hydrochloric, acetic, formic acid and the like; similarly the base used in regenerating the purified chitosan base from the salicylic acid salt thereof may be any organic or inorganic base provided that the strength of said base is greater than that of chitosan itself ($pK_b'$, about 7.8). In this connection, it will be understood that the utility of salicylic acid is enhanced by raising the temperature to increase its solubility. In the course of my investigation of the process of my invention I have preferred to employ diethylamine as the base inasmuch as it is a convenient reagent, of adequate basic strength and which leaves no residual ash. Further, among the process variables the ratio of equivalents of salicylate reagent to equivalents of chitosan, may also vary widely and appears to control the product yields in the vicinity of the value of about 2 of said ratio, as shown in Table IV. In the interest of high process yields it is preferred to use values of said ratio of not less than 3.

TABLE IV

*Effect of sodium salicylate chitosan ratio on yield of chitosan salicylate precipitate*

| Sample Number | 1 | 2 | 3 |
|---|---|---|---|
| Equivalents of Sodium Salicylate added per Equivalent of Chitosan | 2.28 | 2.84 | 3.41 |
| Percent of Theoretical Yield of Precipitated Chitosan Salicylate | 32.3 | 72.1 | 89.6 |

The following examples are illustrative of my invention:

EXAMPLE I

Crude chitosan (16.1 g.) which upon analysis was found to contain 7.65% nitrogen (hence 16.1 g. of the chitosan represents 0.088 equivalent), was treated with normal aqueous acetic acid (88 cc.) and the resulting mixture was diluted with water (500 cc.), and heated at 50–55° C. for about fifteen minutes. The resulting viscous solution was filtered through an asbestos filter pad and the volume of the filtrate adjusted to 640 cc. and then treated with a solution of sodium salicylate (56 g., 0.35 equivalent) in water (560 cc.) and the resulting mixture was heated to about 50° C. to effect a clear solution. The latter was then cooled at 5° C. overnight with continuous stirring. The precipitate obtained in this manner was separated by centrifugation, dissolved in the minimum volume of water whereafter the solution was filtered and the filtrate was adjusted to pH 8–9 with 2 N methanolic diethylamine. The resulting precipitate was washed first with hot methanol until free of salicylate ion (by the ferric chloride test), then with ether and was finally dried at 70° C. under vacuum. The desired purified chitosan (13.3 g.) contained 8.30% nitrogen. The results of this experiment are summarized in Table I.

EXAMPLE II

A sample of chitosan (6.0 g., reduced viscosity, 0.758) which upon analysis was found to contain 8.43% N (hence the 6.0 g. of chitosan represent 0.0362 equivalent) was dissolved in normal aqueous acetic acid (37 cc.) and the resulting solution was diluted with water (100 cc.) and then treated with sodium salicylate (17.9 g., 0.112 equivalent) and heated to 60° C. until all suspended solid dissolved. The resulting clear solution was allowed to cool gradually to 35° C. whereupon a precipitate began to separate. The temperature of the mixture was maintained at 35° C. for one hour with continuous stirring and thereafter the precipitate was collected by centrifugation. The mother liquor was cooled further and a number of additional fractions were separated in a similar manner (see Table II). Each of the aforesaid fractions, consisting of chitosan salicylate, were separately dissolved in water and decomposed by treatment with 2 N methanolic diethylamine until the pH of the mixture was about 9. In each case the liberated fraction of chitosan base was thoroughly washed with hot methanol, then with ether and was finally dried at 70° C. under vacuum. The various desired fractions of purified chitosan were thus obtained having the characteristics set forth in Table II.

I claim:
1. The method of recovering purified chitosan from crude chitosan which comprises forming an aqueous solution of an acid salt of crude chitosan, adding at least two equivalents of a soluble salicylate per equivalent of chitosan to said solution of chitosan salt, separating the resulting precipitate of chitosan salicylate, decomposing said chitosan salicylate with a base and separating the resulting purified regenerated chitosan.

2. The method set forth in claim 1, wherein said acid salt of chitosan comprises the acetate.

3. The method set forth in claim 1 wherein said base comprises diethylamine.

4. The method set forth in claim 1 wherein said soluble salicylate comprises an alkali metal salicylate.

5. The method of recovering purified chitosan from crude chitosan which comprises forming an aqueous solution of an acid salt of crude chitosan, adding at least two equivalents of a soluble salicylate per equivalent of chitosan to said solution of chitosan salt, warming the resulting mixture until a clear solution results, chilling the solution to about 5° C., separating the resulting precipitate of chitosan salicylate, decomposing said chitosan salicylate with a base and separating the resulting purified regenerated chitosan.

6. The method of recovering purified chitosan from an acid salt of crude chitosan, which comprises adding at least two equivalents of a soluble salicylate per equivalent of chitosan to an aqueous solution of said chitosan salt, separating the resulting precipitate of chitosan salicylate, decomposing said chitosan salicylate with a base and separating the resulting purified regenerated chitosan.

7. The method of fractionating chitosan into a plurality of fractions of increased homogeneity which comprises adding at least two equivalents of a soluble salicylate per equivalent of chitosan to an aqueous solution of an acid salt of chitosan, warming the resulting mixture until substantially clear solution results, gradually cooling the solution to a series of progressively lower temperature levels, separating the fraction of chitosan salicylate which precipitates at each of said temperature levels, separately decomposing each of said fractions of chitosan salicylate with a base and separating the resulting series of regenerated chitosan fractions of varying molecular weights.

8. The method set forth in claim 7, wherein said acid salt of chitosan comprises the acetate.

9. The method set forth in claim 7, wherein said base comprises diethylamine.

10. The method set forth in claim 7 wherein said soluble salicylate comprises an alkali metal salicylate.

References Cited in the file of this patent
UNITED STATES PATENTS 2,040,879    Rigby _____ May 19, 1936

OTHER REFERENCES

Loewy: Chem. Abs., 4, 609 (1910).